(12) United States Patent
Karve et al.

(10) Patent No.: US 11,121,942 B2
(45) Date of Patent: Sep. 14, 2021

(54) ORCHESTRATION ENGINE FACILITATING MANAGEMENT OF DYNAMIC CONNECTION COMPONENTS

(71) Applicant: International Business Machines Corporation, Armonk, NY (US)

(72) Inventors: Alexei Karve, Mohegan Lake, NY (US); Thomas E. Chefalas, Somers, NY (US); Matthew X. Staffelbach, White Plains, NY (US); Neeraj Asthana, Acton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 313 days.

(21) Appl. No.: 15/945,344

(22) Filed: Apr. 4, 2018

(65) Prior Publication Data
US 2019/0312795 A1    Oct. 10, 2019

(51) Int. Cl.
*H04L 12/24*    (2006.01)
*H04L 29/08*    (2006.01)

(52) U.S. Cl.
CPC ........ *H04L 41/5054* (2013.01); *H04L 41/082* (2013.01); *H04L 41/0806* (2013.01); *H04L 67/10* (2013.01)

(58) Field of Classification Search
CPC . H04L 41/5054; H04L 41/0806; H04L 67/10; H04L 41/082
See application file for complete search history.

(56) References Cited

U.S. PATENT DOCUMENTS

| | | | |
|---|---|---|---|
| 9,432,350 B2 | 8/2016 | Anderson et al. | |
| 9,535,754 B1 * | 1/2017 | Suarez | G06F 9/5011 |
| 9,805,322 B2 | 10/2017 | Kelkar et al. | |
| 10,120,669 B2 * | 11/2018 | Karagiannis | H04L 41/5096 |

(Continued)

OTHER PUBLICATIONS

Mel, et al., The NIST Definition of Cloud Computing, National Institute of Standards and Technology Special Publication 800-145, Sep. 2011, 7 Pages.

*Primary Examiner* — Nicholas R Taylor
*Assistant Examiner* — Tania M Pena-Santana
(74) *Attorney, Agent, or Firm* — Amin, Turocy & Watson, LLP

(57) ABSTRACT

Systems, computer-implemented methods, and computer program products that facilitate orchestration engine components for a cloud computing environment are provided. According to an embodiment, a system can comprise a memory that stores computer executable components and a processor that executes the computer executable components stored in the memory. The computer executable components can comprise a ranking component that can rank respective connection components based on one or more attributes of the respective connection components. The computer executable components can further comprise a selection component that can select a connection component based on rank. The computer executable components can also comprise an orchestration engine component that can, based on the selected connection component, operatively couple a provisioning component to a computing resource component t of a cloud-based computing platform.

20 Claims, 10 Drawing Sheets

(56) References Cited

U.S. PATENT DOCUMENTS

| | | | |
|---|---|---|---|
| 2009/0037601 A1* | 2/2009 | Jain | H04L 12/66 709/242 |
| 2011/0016214 A1 | 1/2011 | Jackson | |
| 2012/0246317 A1 | 9/2012 | Eriksson et al. | |
| 2013/0232480 A1* | 9/2013 | Winterfeldt | G06F 8/60 717/177 |
| 2014/0089322 A1* | 3/2014 | Garcia | G06Q 10/101 707/748 |
| 2015/0032817 A1 | 1/2015 | Garg et al. | |
| 2015/0242204 A1* | 8/2015 | Hassine | H04L 67/00 717/121 |
| 2016/0087956 A1* | 3/2016 | Maheshwari | H04L 47/125 726/6 |
| 2017/0346755 A1 | 11/2017 | Caminiti et al. | |

\* cited by examiner

DECLARATIVE-BASED REPRESENTATION

```
resource "tls_private_key" "ansiblekey" {
    algorithm = "RSA"
    provisioner "local-exec" {
        command = "cat > ansiblekey.pem <<EOL\n${tls_private_key.ansiblekey.private_key_pem}\nEOL"
    }
}
resource "aws_instance" "web" {
    connection { id = 0
        type = "ssh"
        user = "root"
        private_key = "${file(var.ssh_key)}"
    }
    provisioner "remote-exec" {
        inline = [
            "export user=\"$var.ansible_username\"", "useradd $user", "mkdir /home/ansible/.ssh",
            "echo $tls_private_key.ansiblekey.public_key_openssh\" >> /home/ansible/.ssh/authorized_keys",
            "chown -R ansible:ansible /home/ansible/.ssh",
            "echo \"ALL=(ALL) NOPASSWD: ALL\" >> /etc/sudoers",
            "rm -rf /root/.ssh/authorized_keys",
        ]
    }
}   // returns [connection { id = 1 sources
    type = "ssh"
    user = "$user"
    private_key = "ansiblekey.pem"
    privilege_escalation = true
    } connection filter {$user:/root"}] {
    enabled = false
}
provisioner "ansible" {
    connection filter {"user":"$var.ansible_username"}
    playbook = "ansible/playbook.yml"
    groups = ["all"]
    hosts = ["terraform"]
    extra_vars = { "env": "terraform" }
}
```

ORCHESTRATION ENGINE FACILITATING MANAGEMENT OF DYNAMIC CONNECTION COMPONENTS

BACKGROUND

The subject disclosure relates to cloud computing systems, and more specifically, to orchestration engines for cloud computing systems.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate orchestration engine components for a cloud computing environment are described.

According to an embodiment, a system can comprise a memory that stores computer executable components and a processor that executes the computer executable components stored in the memory. The computer executable components can comprise a ranking component that can rank respective connection components based on one or more attributes of the respective connection components. The computer executable components can further comprise a selection component that can select a connection component based on rank. The computer executable components can also comprise an orchestration engine component that can, based on the selected connection component, operatively couple a provisioning component to a computing resource component of a cloud-based computing platform.

According to another embodiment, a computer-implemented method can comprise ranking, by a system operatively coupled to a processor, respective connection components based on one or more attributes of the respective connection components. The computer-implemented method can further comprise selecting, by the system, a connection component based on rank. The computer-implemented method can also comprise operatively coupling, by the system, a provisioning component to a computing resource component of a cloud-based computing platform, based on the selected connection component.

According to yet another embodiment, a computer program product that can facilitate an orchestration engine process is provided. The computer program product can comprise a computer readable storage medium having program instructions embodied therewith, the program instructions can be executable by a processing component to cause the processing component to rank, by the processor, respective connection components based on one or more attributes of the respective connection components. The program instructions can further cause the processing component to select, by the processor, a connection component based on rank. The program instructions can also cause the processing component to operatively couple, by the processor, a provisioning component to a computing resource component of a cloud-based computing platform, based on the selected connection component.

DESCRIPTION OF THE DRAWINGS

FIG. 5 illustrates an example, non-limiting declarative-based representation 500 that facilitates orchestration engine components for a cloud computing environment in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
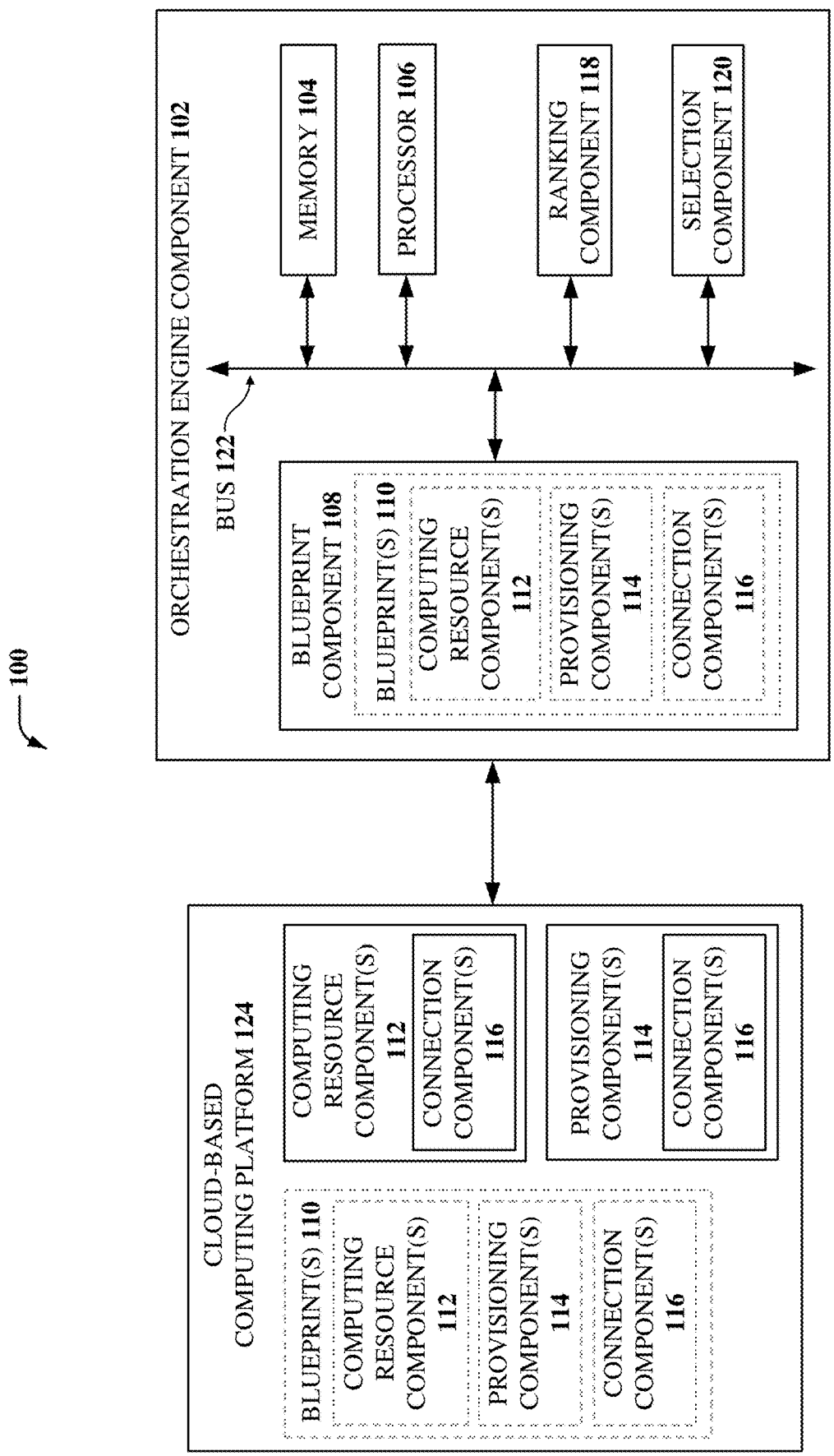
FIG. 1 illustrates a block diagram of an example, non-limiting system 100 that facilitates orchestration engine components for a cloud computing environment in accordance with one or more embodiments described herein.

FIG. 1 illustrates a block diagram of an example, non-limiting system 100 that facilitates orchestration engine components for a cloud computing environment in accordance with one or more embodiments described herein. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Continuing now with FIG. 1, according to several embodiments, the system 100 can comprise an orchestration engine component 102. In some embodiments, the orchestration engine component 102 can comprise a memory 104, a processor 106, a blueprint component 108, a ranking component 118, a selection component 120, and/or a bus 122. In some embodiments, the blueprint component 108 can comprise one or more blueprint 110 that can respectively comprise one or more computing resource component 112, one or more provisioning component 114, and/or one or more connection component 116.

According to some embodiments, the orchestration engine component 102 can be in communication (e.g., over a network, such as the Internet) with a cloud-based computing platform 124. In several embodiments, the cloud-based computing platform 124 can comprise a cloud computing environment. In some embodiments, the cloud-based computing platform 124 can be a private cloud-based computing platform. In other embodiments, the cloud-based computing platform 124 can be a community cloud-based computing platform. In yet other embodiments, the cloud-based computing platform 124 can be a public cloud-based computing platform. In still other embodiments, the cloud-based computing platform 124 can be a hybrid cloud-based computing platform.

In some embodiments, the cloud-based computing platform 124 can comprise one or more blueprint 110 that can comprise one or more computing resource component 112, one or more provisioning component 114, and/or one or more connection component 116. In some embodiments, the cloud-based computing platform 124 can comprise one or more computing resource component 112 and/or one or more provisioning component 114. In such embodiments, the computing resource component 112 and/or the provisioning component 114 can respectively comprise one or more connection component 116.

It should be appreciated that the embodiments of the subject disclosure depicted in various figures disclosed herein are for illustration only, and as such, the architecture of such embodiments are not limited to the systems, devices, aspects, and/or components depicted therein. For example, in some embodiments, the system 100 and/or the orchestration engine component 102 can further comprise various computer and/or computing-based elements described herein with reference to operating environment 800 and FIG. 8. In several embodiments, such computer and/or computing-based elements can be used in connection with implementing one or more of the systems, devices, aspects, and/or components shown and described in connection with FIG. 1 or other figures disclosed herein.

Figure 9:
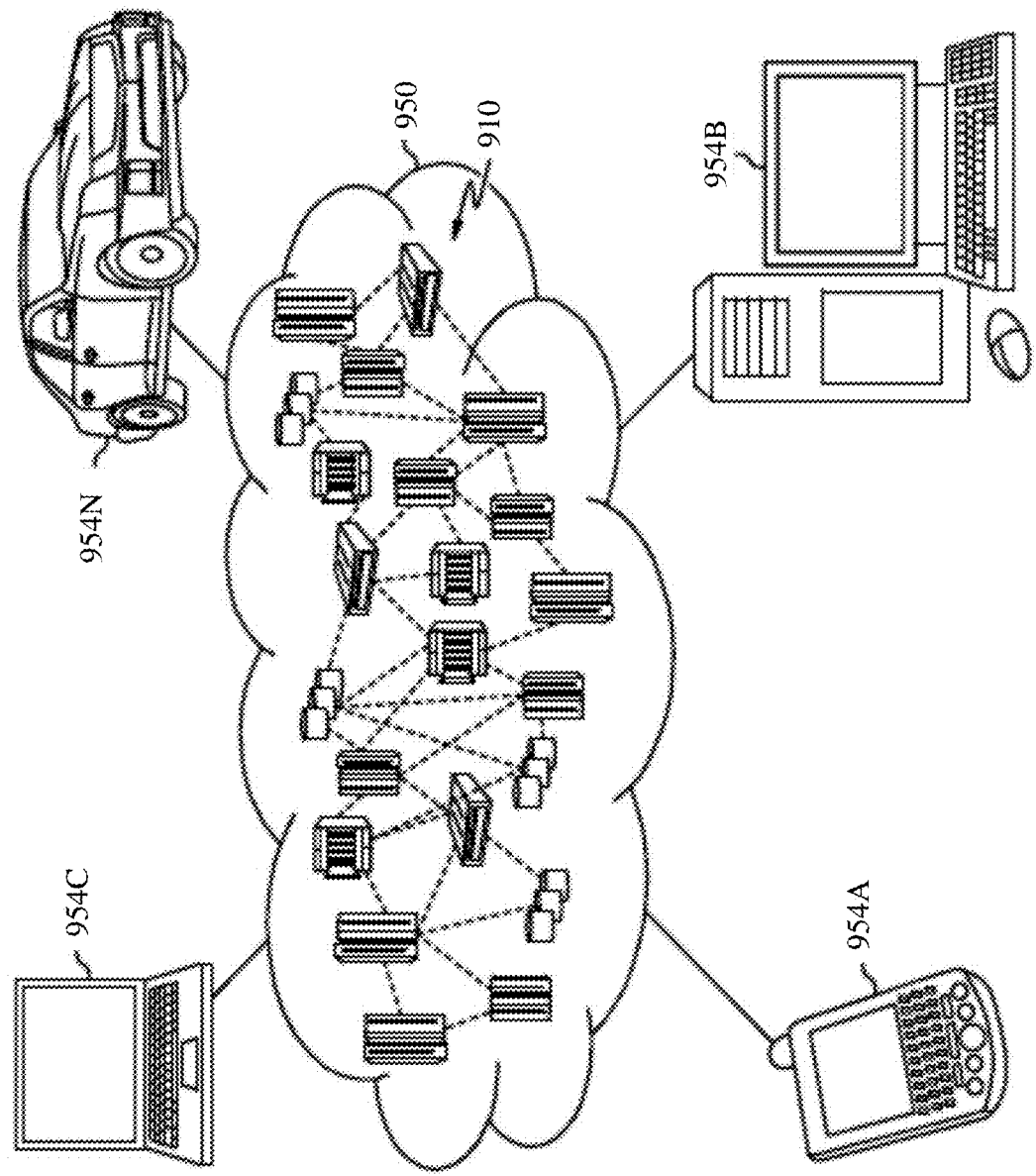
FIG. 9 illustrates a block diagram of an example, non-limiting cloud computing environment 950 in accordance with one or more embodiments of the subject disclosure.

In other embodiments, the system 100 and/or the cloud-based computing platform 124 can further comprise various cloud computing nodes described herein with reference to cloud computing environment 950 and FIG. 9. In some embodiments, the system 100 and/or the cloud-based computing platform 124 can further comprise various functional abstraction layers described herein with reference to hardware and software layer 1060, virtualization layer 1070, management layer 1080, and/or workloads layer 1090 and FIG. 10.

According to several embodiments, the memory 104 can store one or more computer and/or machine readable, writable, and/or executable components and/or instructions that, when executed by the processor 106, can facilitate performance of operations defined by the executable component(s) and/or instruction(s). For example, the memory 104 can store computer and/or machine readable, writable, and/or executable components and/or instructions that, when executed by the processor 106, can facilitate execution of the various functions described herein relating to the orchestration engine component 102, the blueprint component 108, the blueprint 110, the computing resource component 112, the provisioning component 114, the connection component 116, the ranking component 118, the selection component 120, and/or the cloud-based computing platform 124.

In several embodiments, the memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of the memory 104 are described below with reference to the system memory 816 and FIG. 8. Such examples of memory 104 can be employed to implement one or more embodiments of the subject disclosure.

According to some embodiments, the processor 106 can comprise one or more types of processors and/or electronic circuitry that can implement one or more computer and/or machine readable, writable, and/or executable components and/or instructions that can be stored on the memory 104. For example, the processor 106 can perform various operations that can be specified by such computer and/or machine readable, writable, and/or executable components and/or instructions including, but not limited to, logic, control, input/output (I/O), arithmetic, and/or the like. In some embodiments, the processor 106 can comprise one or more central processing unit, multi-core processor, microprocessor, dual microprocessors, microcontroller, System on a Chip (SOC), array processor, vector processor, and/or the like.

In some embodiments, one or more of the orchestration engine component 102, the memory 104, the processor 106, the blueprint component 108, the ranking component 118, and/or the selection component 120 can be communicatively, electrically, and/or operatively coupled to one another via the bus 122, for example, to perform one or more functions of the system 100, the orchestration engine component 102, and/or any components coupled therewith. In several embodiments, the bus 122 can comprise one or more memory bus, memory controller, peripheral bus, external bus, local bus, and/or the like that can employ various bus architectures. Further examples of the bus 122 are described below with reference to the system bus 818 and FIG. 8. Such examples of bus 122 can be employed to implement one or more embodiments of the subject disclosure.

In several embodiments, the orchestration engine component 102 can comprise one or more computer and/or machine readable, writable, and/or executable components and/or instructions that, when executed by the processor 106 can facilitate performance of operations defined by such component(s) and/or instruction(s). Consequently, according to numerous embodiments, the orchestration engine component 102 can employ the processor 106 to execute such component(s) and/or instruction(s) to facilitate performance of one or more operations described herein with reference to the orchestration engine component 102.

According to multiple embodiments, the orchestration engine component 102 can facilitate performance of operations related to managing one or more computing resource components 112, one or more provisioning components 114, and/or one or more connection components 116 associated with the cloud-based computing platform 124. For example, the orchestration engine component 102 can employ the processor 106 to execute one or more read, write, and/or execute components and/or instructions that can facilitate performance of such management operations described below.

In some embodiments, the orchestration engine component 102 can employ one or more connection components 116 to establish a connection (e.g., an operative and/or communicative connection) between one or more computing resource components 112 and one or more provisioning components 114, to provision such computing resource components 112. For example, the connection component 116 can comprise connection details (e.g., computer and/or machine read, write, and/or executable components and/or instructions) that, when executed by the processor 106, can facilitate establishing a connection (e.g., an operative and/or communicative connection) between the computing resource component 112 and the provisioning component 114.

In some embodiments, the orchestration engine component 102 can facilitate employing one or more connection components 116 to establish a connection (e.g., an operative and/or communicative connection) between one or more provisioning component 114 and one or more other provisioning component (e.g., one or more other provisioning component 114), to provision such other provisioning component. For example, the connection component 116 can comprise connection details (e.g., computer and/or machine read, write, and/or executable components and/or instructions) that, when executed by the processor 106, can facilitate establishing a connection (e.g., an operative and/or communicative connection) between the provisioning component 114 and the other provisioning component.

In several embodiments, based on the orchestration engine component 102 employing the connection component 116 to establish a connection between the provisioning component 114 and the computing resource component 112 (and/or another provisioning component), the orchestration engine component 102 can further facilitate engaging the provisioning component 114 to provision the computing resource component 112 (and/or another provisioning component). For example, based on the orchestration engine component 102 enabling such a communicative and/or operative connection, the provisioning component 114 can deploy and/or execute one or more provisioning scripts on the computing resource component 112 (and/or another provisioning component) to complete various provisioning tasks (e.g., creating, configuring, reading, modifying, cleaning, and/or deleting the computing resource component 112 and/or another provisioning component).

According to several embodiments, the blueprint component 108 can comprise one or more computer and/or machine readable, writable, and/or executable components and/or instructions that, when executed by the processor 106 can facilitate performance of operations defined by such component(s) and/or instruction(s). Consequently, according to numerous embodiments, the blueprint component 108 can employ the processor 106 to execute such component(s) and/or instruction(s) to facilitate performance of one or more operations described herein with reference to the blueprint component 108.

In numerous embodiments, the orchestration engine component 102 can employ the blueprint component 108 to facilitate declaring (e.g., specifying) one or more computing resource components 112, one or more provisioning components 114, and/or one or more connection components 116 required to execute one or more workloads (e.g., processing tasks, storing tasks, etc.) associated with the cloud-based computing platform 124. For example, the orchestration engine component 102 can employ the blueprint component 108 to facilitate declaring one or more computing resource components 112, one or more provisioning components 114, and/or one or more connection components 116 by generating one or more blueprints 110 that declare (e.g., specify) such components.

According to multiple embodiments, the blueprint 110 can comprise a template and/or a pattern comprising one or more representations of one or more computing resource components 112, one or more provisioning components 114, and/or one or more connection components 116 required to execute one or more workloads associated with the cloud-based computing platform 124. In some embodiments, the blueprint 110 can comprise a template and/or a pattern comprising one or more declarative representations of such components required to execute one or more workloads associated with the cloud-based computing platform 124. In some embodiments, such a template and/or a pattern comprising one or more such declarative representations can be formatted in a computer and/or machine readable, writable, and/or executable format and/or a human readable format. For example, such a template and/or pattern can comprise a text file rendered on a display (e.g., a monitor) of a computing device.

In other embodiments, the blueprint 110 can comprise a template and/or pattern comprising one or more graphical representations of components declared (e.g., specified) to execute one or more workloads associated with the cloud-based computing platform 124. In some embodiments, such a template and/or a pattern comprising one or more such graphical representations can be formatted in a computer and/or machine readable, writable, and/or executable format and/or human readable format. For example, such a template and/or pattern can comprise a graphical representation rendered on a display (e.g., a monitor) of a computing device.

In other embodiments, the blueprint 110 can comprise a template and/or pattern comprising one or more textual representations of components declared to execute one or more workloads associated with the cloud-based computing platform 124. In some embodiments, such a template and/or a pattern comprising one or more such textual representations can be formatted in a computer and/or machine readable, writable, and/or executable format and/or human readable format. For example, in some embodiments, such a template and/or pattern can comprise a readable text file format comprising a data serialization language. In other embodiments, such a template and/or pattern can comprise a readable text file format comprising a declarative language. In still other embodiments, such a template and/or pattern can comprise a readable text file format comprising automated documentation.

In some embodiments, the blueprint 110 can declare the type (e.g., a processor, virtual machine, storage, middleware, hardware, software, etc.) and/or properties (e.g., processing capacity, storage capacity, compatibility, etc.) of one or more computing resource components 112 that can be employed to execute one or more workloads associated with the cloud-based computing platform 124. In other embodiments, the blueprint 110 can declare one or more provisioning components 114 required to provision (e.g., create, configure, read, modify, clean, delete, etc.) the computing resource component(s) 112. In some embodiments, the blueprint 110 can declare one or more connection components 116 associated with the computing resource components 112 and/or one or more connection components 116 associated with the provisioning components 114.

According to other embodiments, the blueprint 110 can declare one or more relationships and/or dependencies between various computing resource components 112 and/or various provisioning components 114 that can define the sequence (e.g., order) by which the provisioning components 114 can provision the computing resource components 112. For example, the blueprint 110 can declare one or more independent computing resource components 112, one or more independent provisioning components 114, one or more dependent computing resource components 112, and/or one or more dependent provisioning components 114. In such an example, a dependent computing resource component 112 cannot be provisioned by a dependent provisioning component 114 until the independent computing resource component 112 upon which the dependent computing resource component 112 depends, is provisioned by an independent provisioning component 114. In this example, in response to the independent provisioning component 114 completing such provisioning, the independent provisioning component 114 can create one or more dependency connection components that can be employed by the orchestration engine component 102 to facilitate connecting the dependent provisioning component 114 to the dependent computing resource component 112 for provisioning.

In some embodiments, the orchestration engine component 102 can transmit (e.g., export) the blueprint 110 to the cloud-based computing platform 124 (e.g., via a network, such as the Internet) to facilitate employment of the blueprint 110 by the cloud-based computing platform 124. In other embodiments, the orchestration engine component 102 can receive (e.g., import) one or more blueprints 110 associated with the cloud-based computing platform 124. For example, the orchestration engine component 102 can transmit the blueprint 110 to, and/or receive the blueprint 110 from, the cloud-based computing platform 124 as a readable text file that can be formatted in a computer and/or machine readable, writable, and/or executable format and/or a human readable format. In FIG. 1, the blueprint 110 comprising the computing resource components 112, the provisioning components 114, and/or the connection components 116 are depicted with dashed lines to indicate that, according to some embodiments, these components can be transmitted and/or received by the orchestration engine component 102 as described above.

According to some embodiments, the orchestration engine component 102 can facilitate interpreting content of the blueprint 110 (e.g., via reading a text file representation of the blueprint 110) to facilitate performance of various operations related to managing the computing resource components 112, the provisioning components 114, and/or the connection components 116 declared therein for the cloud-based computing platform 124. In other embodiments, the orchestration engine component 102 can determine one or more dependencies between the computing resource components 112 and/or the provisioning components 114 for the cloud-based computing platform 124 based on the content of the blueprint 110. In still other embodiments, the orchestration engine component 102 can facilitate performance of various operations related to managing one or more computing resource components 112, one or more provisioning components 114, and/or one or more connection components 116 that are not declared in the blueprint 110 (e.g., existing computing resource component 112, provisioning component 114, and/or connection component 116 previously created that are associated with the cloud-based computing platform 124 but not declared in the blueprint 110).

In multiple embodiments, the computing resource requirements for executing one or more workloads associated with the cloud-based computing platform 124 can be indicative of hardware characteristics and/or software characteristics required for executing such workloads. For example, in some embodiments, such computing resource requirements for executing one or more workloads associated with the cloud-based computing platform 124 can include, but are not limited to, operating system requirements, memory requirements, processing requirements, and/or other computing resource requirements. Consequently, according to numerous embodiments, the computing resource component 112 can comprise one or more computing resources for hardware associated with the cloud-based computing platform 124 and/or one or more computing resources for software associated with the cloud-based computing platform 124. In other embodiments, the computing resource component 112 can comprise one or more computing resources for a processor associated with the cloud-based based computing platform 124, one or more computing resources for a virtual machine associated with the cloud-based computing platform 124, one or more computing resources for an infrastructure associated with the cloud-based computing platform 124, one or more computing resources for storage associated with the cloud-based computing platform 124, one or more computing resources for middleware associated with the cloud-based computing platform 124, and/or one or more other computing resources associated with the cloud-based computing platform 124.

According to several embodiments, the provisioning component 114 can comprise one or more computer and/or machine readable, writable, and/or executable components and/or instructions that, when executed by the processor 106 can facilitate performance of operations defined by such component(s) and/or instruction(s). Consequently, according to numerous embodiments, the provisioning component 114 can employ the processor 106 to execute such component(s) and/or instruction(s) to facilitate performance of one or more operations described herein with reference to the provisioning component 114.

In several embodiments, the orchestration engine component 102 can employ one or more provisioning components 114 to facilitate deployment of and/or execution of provisioning scripts on one or more computing resource components 112 to, for example, create, configure, read, modify, clean, and/or delete such computing resource components 112. In numerous embodiments, such provisioning scripts can comprise various types of files that can be executed by the computing resource component 112 (e.g., files that can be executed by an operating system of the computing resource component 112, such as combined binary files and/or other operating system supported language, invocation of Swagger or Representational State Transfer (REST) Application Programming Interface (API) calls using curl commands, command line APIs, Bash or PowerShell scripts, etc.).

According to some embodiments, the connection component 116 can comprise one or more computer and/or machine readable, writable, and/or executable components and/or instructions that, when executed by the processor 106 can facilitate performance of operations defined by such component(s) and/or instruction(s). Consequently, according to numerous embodiments, the connection component 116 can employ the processor 106 to execute such component(s) and/or instruction(s) to facilitate performance of one or more operations described herein with reference to the connection component 116.

In several embodiments, the connection components 116 can facilitate establishing a communicative and/or operative connection between one or more computing resource component 112 and one or more provisioning component 114. In some embodiments, the connection components 116 can comprise designations of the connection type and/or protocol (e.g., Simple Object Access Protocol (SOAP), Secure Shell (SSH), Representational State Transfer (REST), etc.). In other embodiments, the connection components 116 can comprise designations of access control features (e.g., username/password, key/value, etc.).

According to some embodiments, the computing resource component 112 and/or the provisioning component 114 can comprise one or more connection component 116 (e.g., local and/or default connection components 116). For example, such incorporated connection components 116 can be employed by the orchestration engine component 102 to establish an initial connection with the computing resource component 112 and/or the provisioning component 114 to facilitate executing initial provisioning of such components (e.g., creating, configuring, and/or bootstrapping such components). In other embodiments, the orchestration engine component 102 can employ the blueprint component 108 to facilitate declaring one or more connection components 116 by generating one or more blueprints 110 that can comprise such one or more connection components 116 (e.g., as described above).

In several embodiments, the orchestration engine component 102 can facilitate storing one or more connection component 116 in a local storage component (e.g., the memory 104) and/or remote storage component. For example, the orchestration engine component 102 and/or associated components can employ the memory 104 to store: connection components 116 incorporated with the computing resource component 112 and/or the provisioning component 114 (e.g., local and/or default connection components 116); connection components 116 declared in a blueprint (e.g., blueprint 110 and/or other blueprints); and/or connection components 116 received and/or retrieved by the orchestration engine component 102.

In some embodiments, the connection component 116 can change, multiply in quantity, and/or reduce in quantity during the lifecycle of the computing resource component 112. For example, in executing one or more provisioning scripts on a computing resource component 112, a provisioning component 114 can create new connection details and/or enable, disenable, change, update, and/or remove (e.g., delete) existing connection details. In this example, such creation, enabling, disabling, changing, updating, and/or removal of connection details effectively alters the connection details (e.g., connection components 116) associated with such computing resource component 112. For instance, throughout the lifecycle of the computing resource component 112, multiple provisioning components 114 can create new connection details and/or enable, disenable, change, update, and/or remove (e.g., delete) existing connection details, resulting in multiple and/or dynamically changing connection components 116 associated with the computing resource component 112.

In several embodiments, the connection components 116 can comprise one or more attributes, such as, for example, one or more access permission levels regarding connecting the provisioning component 114 to the computing resource component 112. In some embodiments, such access permission levels can comprise one or more exclusive access permission levels that facilitate connecting an exclusive provisioning component 114 to the computing resource component 112. For example, in such embodiments, the exclusive access permission levels facilitate connecting only the exclusive provisioning component 114 to the computing resource component 112 (e.g., the connection component 116 comprising exclusive access permission levels cannot be employed to connect other provisioning component 114 to the computing resource components 112). In other embodiments, such access permission levels can comprise one or more non-exclusive access permission levels that facilitate connecting one or more non-exclusive provisioning component 114 to the computing resource component 112. For example, in such embodiments, the connection component 116 can comprise non-exclusive access permission levels that facilitate connecting one or more provisioning component 114 to the computing resource component 112 (e.g., the connection component 116 comprising non-exclusive access permission levels can be employed to connect multiple provisioning component 114 to the computing resource component 112).

According to some embodiments, the ranking component 118 can comprise one or more computer and/or machine readable, writable, and/or executable components and/or instructions that, when executed by the processor 106 can facilitate performance of operations defined by such component(s) and/or instruction(s). Consequently, according to numerous embodiments, the ranking component 118 can employ the processor 106 to execute such component(s) and/or instruction(s) to facilitate performance of one or more operations described herein with reference to the ranking component 118.

In multiple embodiments, the orchestration engine component 102 can employ the ranking component 118 to facilitate ranking one or more connection components 116 according to a ranking value system by which the ranking component 118 facilitates assignment of ranking values (e.g., numerical values ranging from 1 to 10) to respective connection components 116 based on one or more attributes of the respective connection components 116. In some embodiments, the ranking component 118 can assign ranking values to one or more connection components 116 declared in the blueprint 110 and/or one or more other blueprints. For example, the ranking component 118 can facilitate assignment of ranking values (e.g., via the blueprint component 108) to one or more connection components 116 when the blueprint component 108 facilitates declaring (e.g., via generating the blueprint 110) one or more computing resource component 112, one or more provisioning component 114, and/or one or more connection component 116. In other embodiments, the ranking component 118 can facilitate assignment of ranking values (e.g., via one or more provisioning component 114) when a provisioning component 114 executes provisioning script(s) on the computing resource component 112.

In other embodiments, the ranking component can assign ranking values to one or more connection components 116 stored in a memory, such as the memory 104, for example, and/or one or more other memory. In such embodiments, the ranking component 118 can facilitate assignment of ranking values to connection components 116 stored in a memory (e.g., the memory 104) by employing, for example, an associative array, hash table/hash function, database index, database table, and/or machine learning models. For example, the ranking component 118 can employ a hash table/hash function that can implement an associative array structure to facilitate correlating keys with values. In some embodiments, the keys can be the ranking values (e.g., numerical values ranging from 1 to 10) and the values can be the one or more attributes (e.g., access permission levels) associated with the respective connection component 116. In other embodiments, the keys can be the one or more attributes (e.g., access permission levels) associated with the respective connection component 116 and the values can be the ranking values (e.g., numerical values ranging from 1 to 10).

According to some embodiments, the ranking component 118 can assign ranking values to respective connection components 116 based on one or more access permission levels associated with the respective connection components 116. In several embodiments, the ranking component 118 can assign a low-ranking value (e.g., 1) to respective connection components 116 comprising broad access permission levels (e.g., root user access permission levels and/or the non-exclusive access permission levels described above). In other embodiments, the ranking component 118 can assign a high-ranking value (e.g., 10) to respective connection components 116 comprising narrow access permission levels (e.g., superuser access permission levels and/or the exclusive access permission levels described above). In another example, the ranking component 118 can assign a ranking value of 10 to respective connection components 116 comprising a user identification (e.g., userid and/or username) with a key and a disenabled password. In still other embodiments, the ranking component 118 can assign a mid-range ranking value (e.g., 5) to respective connection components 116 comprising semi-broad/semi-narrow access permission levels (e.g., users having "superuser do"/sudo access permission levels).

According to other embodiments, the ranking component 118 can rank one or more connection components 116 (e.g., connection components 116 stored in the memory 104) by assigning ranking values (e.g., numerical values ranging from 1 to 10) to respective connection components 116 based on one or more other attributes of the respective connection components 116, such as, for example, whether the respective connection components 116 allow for and/or require inbound access to, or outbound access from, the computing resource component 112. For instance, the ranking component 118 can assign a ranking value of 3 to a connection component 116 that allows for and/or requires inbound access (e.g., incoming data and/or packets) to the computing resource component 112. In another example, the ranking component 118 can assign a ranking value of 6 to a connection component 116 that allows for and/or requires outbound access (e.g., outgoing data and/or packets) from the computing resource component 112.

According to some embodiments, the selection component 120 can comprise one or more computer and/or machine readable, writable, and/or executable components and/or instructions that, when executed by the processor 106 can facilitate performance of operations defined by such component(s) and/or instruction(s). Consequently, according to numerous embodiments, the selection component 120 can employ the processor 106 to execute such component(s) and/or instruction(s) to facilitate performance of one or more operations described herein with reference to the selection component 120.

In several embodiments, the orchestration engine component 102 can employ the selection component 120 to facilitate selecting one or more connection components 116 according to a selection system by which the selection component 120 selects one or more connection components 116 based on the ranking value (e.g., the numerical value) assigned to the respective connection components 116 by the ranking component 118 (e.g., as described above). In numerous embodiments, the selection component 120 can select one or more connection components 116 that have been assigned a ranking value by the ranking component 118 in accordance with any embodiments described above. For example, the selection component 120 can select one or more connection components 116 declared in the blueprint 110 (and/or other blueprints) and/or stored in the memory 104 (and/or other memory) that have been assigned a ranking value by the ranking component 118 (e.g., as described above).

In other embodiments, the selection component 120 can facilitate selecting one or more connection components 116 based on ranking value (e.g., connection components 116 stored in a memory, such as the memory 104) by employing, for example, an associative array, hash table/hash function, database index, database table, and/or machine learning models. For instance, the selection component 120 can employ a hash table/hash function that can implement an associative array structure to facilitate matching keys to values. In some embodiments, the keys can be the ranking values (e.g., numerical values ranging from 1 to 10) and the values can be the one or more connection component 116. In other embodiments, the keys can be the one or more connection component 116 and the values can be the ranking values (e.g., numerical values ranging from 1 to 10).

In some embodiments, the selection component 120 can select one or more of the connection component 116 having the highest ranking value (e.g., highest magnitude) corresponding therewith. In other embodiments, the selection component 120 can select one or more of the connection component 116 having the lowest ranking value (e.g., lowest magnitude) corresponding therewith. In numerous embodiments, the orchestration engine component 102 can connect (e.g., operatively and/or communicatively couple) one or more of the provisioning component 114 to one or more of the computing resource component 112, using one or more of the connection component 116 selected by the selection component 120.

According to multiple embodiments, the selection component 120 can execute one or more selection cycles. For example, in the event the orchestration engine component 102 fails to connect one or more of the provisioning component 114 to one or more of the computing resource component 112, using a connection component 116 selected by the selection component 120, the selection component 120 can select (e.g., based on rank as described above) another connection component 116 (e.g., a connection component 116 that is different from the connection component 116 originally selected by the selection component 120). In numerous embodiments, the orchestration engine component 102 can connect one or more of the provisioning component 114 to one or more of the computing resource component 112, using the connection component 116 selected by the selection component 120 during the repeated selection cycle. In several embodiments, the selection component 120 can repeat such a selection cycle until the orchestration engine component 102 successfully connects one or more of the provisioning component 114 to one or more of the computing resource component 112, using the connection component 116 selected by the selection component 120 during the one or more repeated selection cycles.

In numerous embodiments, the orchestration engine component 102 and/or associated components (e.g., the blueprint component 108, the blueprint 110, the ranking component 118, the selection component 120, etc.) can be controlled, defined, manipulated, and/or modified by an entity (e.g., an animate entity, such as a human, for example). For instance, the orchestration engine component 102 and/or associated components (e.g., the blueprint component 108, the blueprint 110, the ranking component 118, the selection component 120, etc.) can comprise one or more user interfaces (e.g., graphical user interface (GUI), form-based interface, natural language interface, etc.) that enable an entity (e.g., a human) to input instructions and/or commands to the orchestration engine component 102 and/or associated components. For instance, an entity (e.g., a human) can employ a computing device (e.g., a computer having a keyboard, mouse, and/or monitor) comprising the orchestration engine component 102 and/or associated components to input such instructions and/or commands to the orchestration engine component 102 and/or associated components (e.g., via a graphical user interface (GUI)). In this example, inputting such instructions and/or commands can facilitate controlling, defining, manipulating, and/or modifying the orchestration engine component 102 and/or associated components.

In some embodiments, an entity (e.g., a human) can control, define, manipulate, and/or modify (e.g., as described above) various features of the ranking component 118. For example, an entity can control, define, manipulate, and/or modify the ranking policies, instructions, and/or rules governing, for example, which attributes of the connection components 116 can be ranked by the ranking component 118 and/or what ranking value(s) the ranking component 118 can correlate with such attributes. In some embodiments, an entity (e.g., a human) can control, define, manipulate, and/or modify (e.g., as described above) various features of the selection component 120. For example, an entity can control, define, manipulate, and/or modify the ranking policies, instructions, and/or rules governing, for example: whether the selection component 120 will select the connection component 116 having the highest ranking value or lowest ranking value corresponding therewith; and/or which connection component 116 the selection component 120 will select from multiple connection components 116 having the same ranking value corresponding therewith (e.g., the entity can define a selection policy instructing the selection component 120 to randomly select a connection component 116 from the multiple connection components 116 having the same ranking value corresponding therewith).

Figure 2:
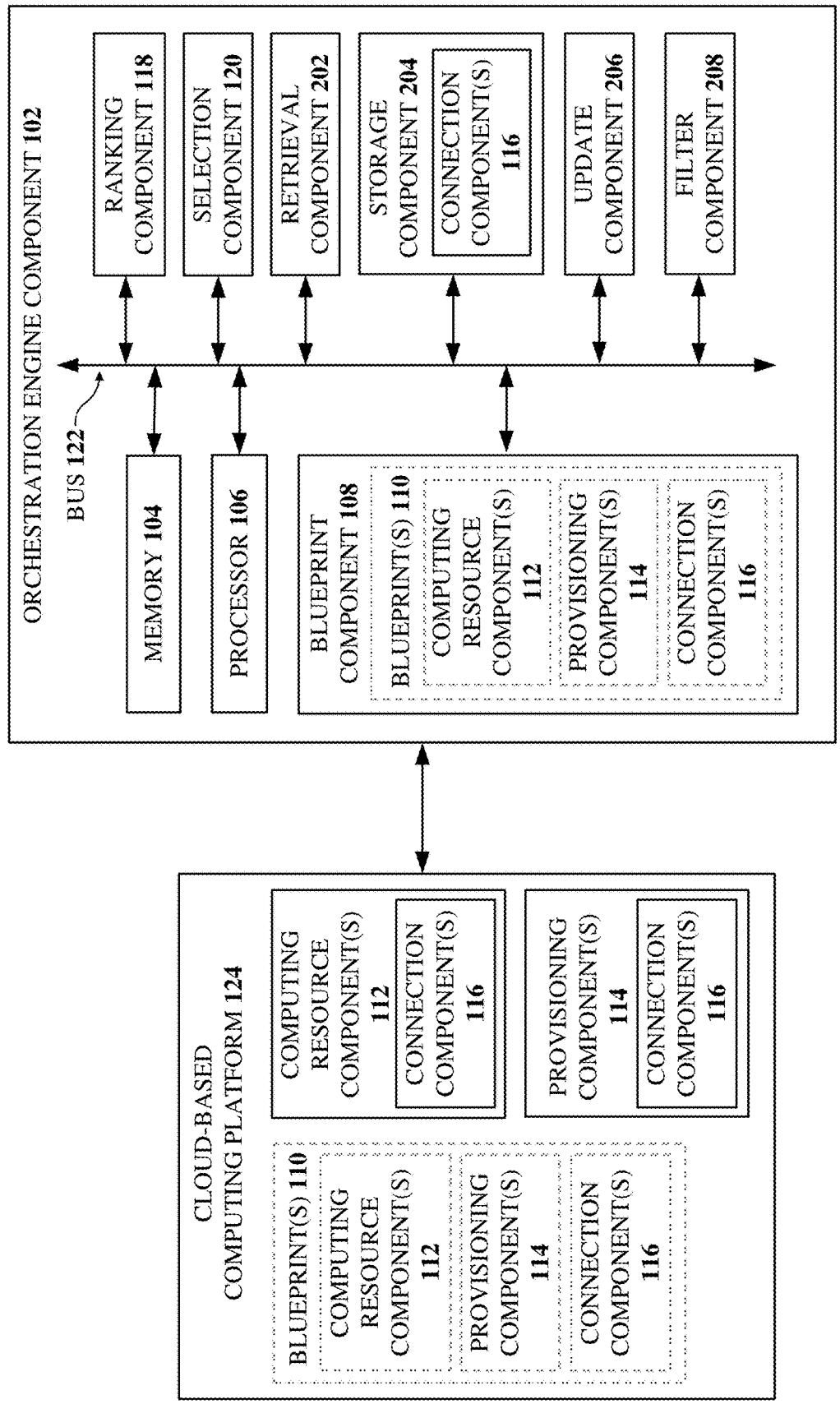
FIG. 2 illustrates a block diagram of an example, non-limiting system 200 that facilitates orchestration engine components for a cloud computing environment in accordance with one or more embodiments described herein.

FIG. 2 illustrates a block diagram of another example, non-limiting system 200 that facilitates orchestration engine components for a cloud computing environment in accordance with one or more embodiments described herein. Repetitive description of like elements employed in respective embodiments is omitted for sake of brevity. In the embodiment shown in FIG. 2, the system 200 and/or the orchestration engine component 102 can comprise a retrieval component 202, a storage component 204, and/or an update component 206. In some embodiments, the storage component 204 can comprise one or more of the connection component 116.

According to several embodiments, the retrieval component 202 can comprise one or more computer and/or machine readable, writable, and/or executable components and/or instructions that, when executed by the processor 106 can facilitate performance of operations defined by such component(s) and/or instruction(s). Consequently, according to numerous embodiments, the retrieval component 202 can employ the processor 106 to execute such component(s) and/or instruction(s) to facilitate performance of one or more operations described herein with reference to the retrieval component 202.

According to multiple embodiments, the orchestration engine component 102 can employ the retrieval component 202 to facilitate retrieving one or more connection components 116 from one or more provisioning components 114. For example, in response to the provisioning component 114 executing one or more provisioning scripts on the computing resource component 112, the retrieval component 202 can facilitate retrieving, from the provisioning component 114 (e.g., via a network, such as the Internet), one or more provisioning scripts, or sections thereof, comprising any new connection details and/or any enabled, disenabled, changed, updated, and/or removed existing connection details (e.g., connection components 116).

According to multiple embodiments, the orchestration engine component 102 can employ the retrieval component 202 to facilitate retrieving one or more connection components 116 from one or more blueprints (e.g., blueprint 110 and/or other blueprints). In other embodiments, the orchestration engine component 102 can employ the retrieval component 202 to retrieve one or more connection components 116 from one or more storage components. In some embodiments, such one or more storage components can comprise a local storage component (e.g., the memory 104, the storage component 204, etc.) and/or a storage component coupled (e.g., communicatively, electrically, operatively, etc.) to a computing resource component, a provisioning component, a blueprint, an orchestration engine component, and/or a cloud-based computing platform that are not associated with the system 200. For instance, the retrieval component 202 can facilitate retrieving (e.g., via a network, such as the Internet) one or more connection components 116 from: a storage component coupled to a computing resource component that is different from the computing resource component 112; a storage component coupled to an orchestration engine component that is different from the orchestration engine component 102; and/or a storage component coupled to and/or associated with a cloud-based computing platform that is different from the cloud-based computing platform 124.

In some embodiments, the retrieval component 202 can retrieve one or more connection components 116 comprising restrictive configuration connection details that can enhance compliance security (e.g., access security and/or access control) associated with accessing a computing resource component 112 and/or a provisioning component 114. For example, the retrieval component 202 can retrieve one or more connection components 116 comprising one or more restrictive configuration connection details (e.g., superuser/sudo access levels, exclusive access permission levels, etc.) that facilitate restricting connection with a computing resource component 112 to one or more discrete and/or exclusive provisioning component 114 (e.g., as described above with reference to the connection component 116 and FIG. 1).

In other embodiments, the retrieval component 202 can retrieve one or more connection components 116 comprising permissive configuration connection details that can reduce compliance security (e.g., access security and/or access control) associated with accessing a computing resource component 112 and/or a provisioning component 114. For example, the retrieval component 202 can retrieve one or more connection components 116 comprising one or more permissive configuration connection details (e.g., root user access levels, non-exclusive access permission levels, etc.) that facilitate connecting a computing resource component 112 to one or more non-exclusive provisioning component 114 (e.g., as described above with reference to the connection component 116 and FIG. 1).

According to several embodiments, the orchestration engine component 102 and/or associated components (e.g., the retrieval component 202, etc.) can facilitate storing the connection components 116 in the storage component 204. For example, the orchestration engine component 102 and/or the retrieval component 202 can employ the storage component 204 to store: connection components 116 incorporated with the computing resource component 112 and/or the provisioning component 114 (e.g., local and/or default connection components 116); connection components 116 declared in a blueprint (e.g., blueprint 110 and/or other blueprints); and/or connection components 116 received and/or retrieved by the orchestration engine component 102 and/or the retrieval component 202.

In some embodiments, the orchestration engine component 102 can comprise (e.g., as illustrated by the embodiment depicted in FIG. 2) and/or be coupled (e.g., communicatively, electrically, operatively, etc.) to the storage component 204. For example, the storage component 204 can comprise a remote storage component coupled communicatively to the orchestration engine component 102 via a network (e.g., the Internet). In other embodiments, the memory 104 and/or another memory can comprise the storage component 204 (e.g., the storage component 204 can be stored in the memory 104 and/or another memory). In several embodiments the storage component 204 can facilitate storing operations in the same or similar manner, utilizing the same or similar components, devices, and/or memory architectures as described herein with reference to the memory 104 and FIG. 1.

According to several embodiments, the update component 206 can comprise one or more computer and/or machine readable, writable, and/or executable components and/or instructions that, when executed by the processor 106 can facilitate performance of operations defined by such component(s) and/or instruction(s). Consequently, according to numerous embodiments, the update component 206 can employ the processor 106 to execute such component(s) and/or instruction(s) to facilitate performance of one or more operations described herein with reference to the update component 206.

According to multiple embodiments, the orchestration engine component 102 can employ the update component 206 to facilitate updating various connection components 116. For example, the update component 206 can facilitate updating: connection components 116 incorporated with the computing resource component 112 and/or the provisioning component 114 (e.g., local and/or default connection components 116); connection components 116 declared in a blueprint (e.g., blueprint 110 and/or other blueprints); and/or connection components 116 stored in a memory (e.g., the memory 104, the storage component 204, and/or other memory).

In some embodiments, the update component 206 can facilitate updating the connection components 116 in response to the retrieval component 202 retrieving one or more new, enabled, disenabled, changed, updated, and/or removed connection details (e.g., connection components 116) as described above. In other embodiments, the update component 206 can facilitate updating such connection components 116 in response to the orchestration engine component 102 failing to connect a provisioning component 114 to a computing resource component 112, using a connection component 116 that fails to facilitate such a connection. For example, the update component 206 can facilitate removing (e.g., deleting), from the storage component 204, a connection component 116 that failed to facilitate a connection between a provisioning component 114 and a computing resource component 112 when employed by the orchestration engine component 102 to establish such a connection.

In still other embodiments, the update component 206 can facilitate updating a blueprint (e.g., the blueprint 110) in response to the orchestration engine component 102 successfully connecting a provisioning component 114 to a computing resource component 112. For example, in response to the orchestration engine component 102 successfully establishing such a connection, the provisioning component 114 can provision the computing resource component 112, and in response to such provisioning, the update component 206 can facilitate removing (e.g., deleting) the provisioning component 114 from the blueprint 110.

According to several embodiments, the filter component 208 can comprise one or more computer and/or machine readable, writable, and/or executable components and/or instructions that, when executed by the processor 106 can facilitate performance of operations defined by such component(s) and/or instruction(s). Consequently, according to numerous embodiments, the filter component 208 can employ the processor 106 to execute such component(s) and/or instruction(s) to facilitate performance of one or more operations described herein with reference to the filter component 208.

According to multiple embodiments, the orchestration engine component 102 can employ the filter component 208 to facilitate detecting one or more dependency connection components (e.g., dependency connection components described above with reference to the blueprint 110 and FIG. 1). For example, the filter component 208 can facilitate detecting such dependency connection components amongst: connection components 116 incorporated with the computing resource component 112 and/or the provisioning component 114 (e.g., local and/or default connection components 116); connection components 116 declared in a blueprint (e.g., blueprint 110 and/or other blueprints); connection components 116 stored in a memory (e.g., the memory 104, the storage component 204, and/or other memory), and/or connection components 116 received and/or retrieved by the orchestration engine component 102 and/or the retrieval component 202. According to multiple embodiments, in response to the filter component 208 facilitating detection of one or more dependency connection components, the orchestration engine component 102 can employ such dependency connection component(s) to facilitate communicatively and/or operatively connecting one or more dependent provisioning components 114 to one or more dependent computing resource components 112.

In some embodiments, the orchestration engine component 102 can be an orchestration engine system and/or an orchestration engine processes associated with technologies such as, but not limited to, cloud computing technologies, computer technologies, server technologies, information technologies, machine learning technologies, artificial intelligence technologies, digital technologies, data analysis technologies, and/or other computer technologies. In some embodiments, the orchestration engine component 102 can employ hardware and/or software to solve problems that are highly technical in nature, that are not abstract and that cannot be performed as a set of mental acts by a human. For example, the orchestration engine component 102 can automatically manage (e.g., track, retrieve, and/or update) connection components associated with the computing resources of a cloud computing environment, throughout the lifecycle of such computing resources (e.g., via the retrieval component 202, the update component 206, etc.).

In some embodiments, the orchestration engine component 102 can provide technical improvements to cloud computing systems, computer systems, server systems, information technology systems, machine learning systems, artificial intelligence systems, digital systems, data analysis systems, and/or other systems. For example, the orchestration engine component 102 can automatically select an optimal connection mechanism (e.g., connection component 116) for connecting one or more provisioning agents to one or more computing resources of a cloud computing environment, thereby eliminating the need for an entity declaring such computing resources to declare such connection mechanism. Further, the orchestration engine component 102 can provide connection failure recovery and/or interruption-free connection between provisioning agents and computing resources of a cloud computing environment (e.g., via the selection component 120 executing repeated selection cycle(s) as described above.

In some embodiments, the orchestration engine component 102 can provide technical improvements to a processing unit associated with an orchestration engine process by improving processing performance of the processing unit, improving processing efficiency of the processing unit, and/or reducing an amount of time for the processing unit to perform a patch management process (e.g., patching and/or upgrading various computing resources for a cloud computing environment). For example, the orchestration engine component 102 can automatically rank multiple connection mechanisms and, based on ranking, select the optimal connection mechanisms for connecting multiple provisioning components to multiple computing resources of a cloud computing environment (e.g., via the ranking component 118 and selection component 120), thereby reducing processing time and/or efficiency associated with a processor (e.g., processor 106) tasked with executing such selection of connection mechanisms. Further, by automatically removing (e.g., deleting), from a memory, connection mechanisms (e.g., connection components 116) that fail to establish a connection between a provisioning agent and a computing resource of a cloud computing environment, the orchestration engine component 102 can reduce the quantity of connection mechanisms stored in such memory and/or processed by a processor, thereby facilitating improved storage capacity associated with such memory (e.g., the memory 104 and/or the storage component 204) and/or improved processing time and/or efficiency associated with such a processor (e.g., processor 106). Moreover, by automatically detecting and immediately employing dependency connection mechanisms (e.g., via the filter component 208), the orchestration engine component 102 can eliminate the need to declare a provisioning sequence and prevent deactivation of any provisioning agents before such agents execute provisioning, thereby improving processing time and/or efficiency associated with a processor (e.g., processor 106) facilitating execution of provisioning computing resources of a cloud computing environment.

In some embodiments, the orchestration engine component 102 can also provide technical improvements to a cloud computing environment by improving processing performance of the cloud computing environment and/or improving processing efficiency of the cloud computing environment. For example, the orchestration engine component 102 can share and/or exchange (e.g., via networks 406), with other orchestration engines (e.g., orchestration engine components 402), the optimal connection mechanisms selected by the orchestration engine component. In such an example, the efficiency and/or performance of hardware (e.g., a processor) and/or software coupled to such other orchestration engines can thereby be improved, which effectively improves the efficiency and/or performance of the cloud computing environment(s) with which such other orchestration engines are associated.

It is to be appreciated that the orchestration engine component 102 can perform an orchestration engine process utilizing various combinations of electrical components, mechanical components, and circuitry that cannot be replicated in the mind of a human or performed by a human (e.g., such orchestration engine process is greater than the capability of a human mind). For example, the amount of data processed, the speed of processing such data, and/or the types of data processed by the orchestration engine component 102 over a certain period of time can be greater, faster, and/or different than the amount, speed, and/or data type that can be processed by a human mind over the same period of time.

According to several embodiments, the orchestration engine component 102 can also be fully operational towards performing one or more other functions (e.g., fully powered on, fully executed, etc.) while also performing the above-referenced orchestration engine process. It should also be appreciated that the orchestration engine component 102 can include information that is impossible to obtain manually by an entity, such as a human user. For example, the type, amount, and/or variety of information included in one or more computing resource component 112, provisioning component 114 and/or connection component 116 can be more complex than information obtained manually by a human user.

Figure 3:
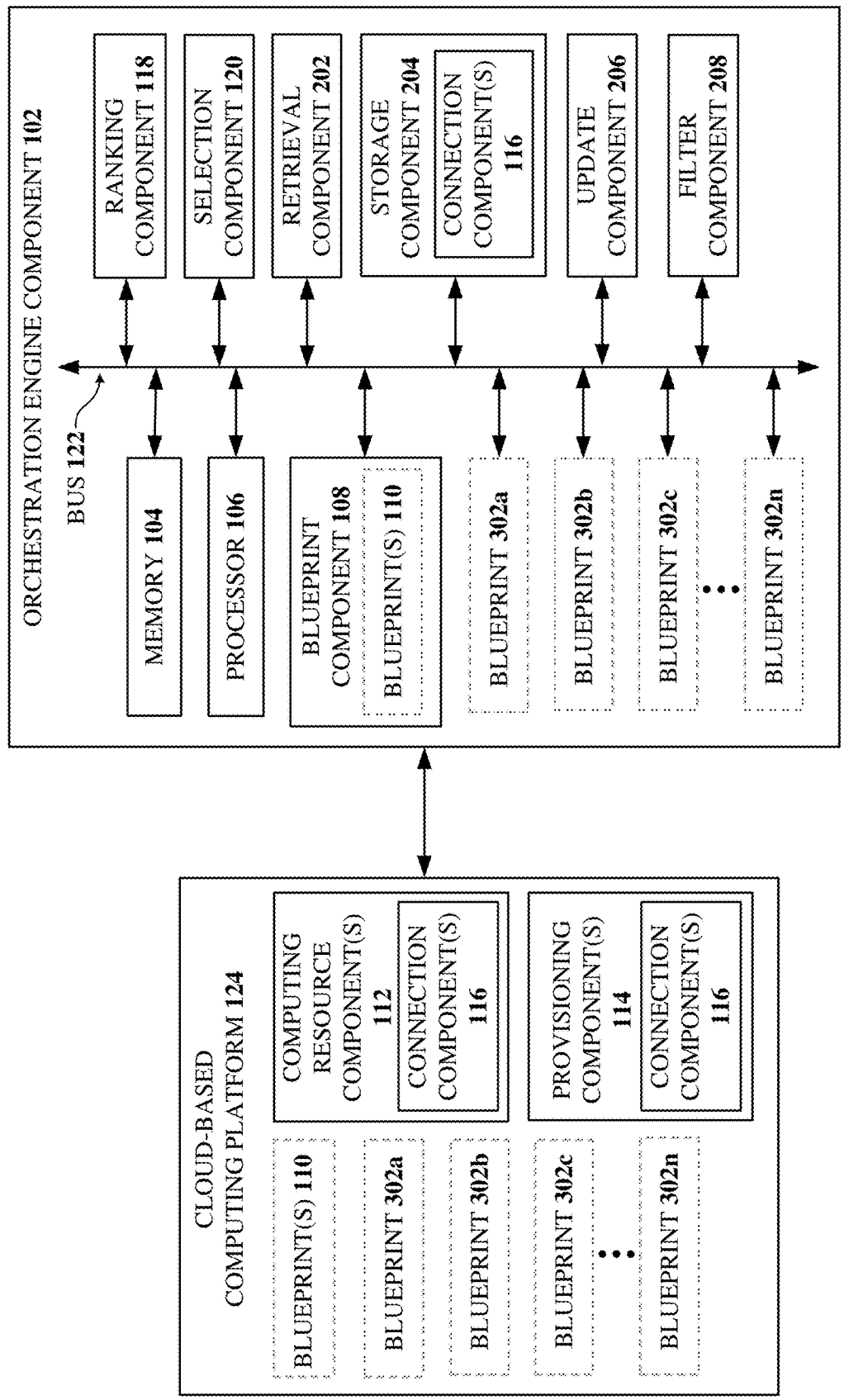
FIG. 3 illustrates a block diagram of an example, non-limiting system 300 that facilitates orchestration engine components for a cloud computing environment in accordance with one or more embodiments described herein.

FIG. 3 illustrates a block diagram of another example, non-limiting system 300 that facilitates orchestration engine components for a cloud computing environment in accordance with one or more embodiments described herein. Repetitive description of like elements employed in respective embodiments is omitted for sake of brevity.

In some embodiments, the cloud-based computing platform 124 and/or the cloud-based computing platform 124 can comprise one or more blueprints 302*a*, 302*b*, 302*c*, 302*n* not generated by the blueprint component 108. For example, such blueprints 302*a*, 302*b*, 302*c*, 302*n* can be generated by an orchestration engine other than (e.g., different from) the orchestration engine component 102. In such an example, the blueprints 302*a*, 302*b*, 302*c*, 302*n* can be transmitted to the cloud-based computing platform 124 by such other orchestration engine (e.g., via a network, such as the Internet) to facilitate employment of such blueprints 302*a*, 302*b*, 302*c*, 302*n* by the cloud-based computing platform 124. In multiple embodiments, the blueprints 302*a*, 302*b*, 302*c*, 302*n* can be the same as, similar to, or different from the blueprints 110 described above with reference to FIG. 1 and FIG. 2. For example, the blueprints 302*a*, 302*b*, 302*c*, 302*n* can comprise the same, similar, or different computing resource components, provisioning components, connection components, properties, formats, functionalities, etc., as the blueprints 110 described above with reference to FIG. 1 and FIG. 2.

In several embodiments, the orchestration engine component 102 can receive and/or retrieve the blueprints 302*a*, 302*b*, 302*c*, 302*n* from the cloud-based computing platform 124. For example, the orchestration engine component 102 can receive the blueprints 302*a*, 302*b*, 302*c*, 302*n* from the cloud-based computing platform 124 as readable text files that can be formatted in a computer and/or machine readable, writable, and/or executable format and/or a human readable format. In FIG. 3, the blueprints 302*a*, 302*b*, 302*c*, 302*n* are depicted with dashed lines to indicate that, according to some embodiments, the blueprints 302*a*, 302*b*, 302*c*, 302*n* can be transmitted and/or received by the orchestration engine component 102 as described above.

In some embodiments, the orchestration engine component 102 can facilitate interpreting content of the blueprints 302*a*, 302*b*, 302*c*, 302*n* (e.g., via reading text file representations of the blueprints 302*a*, 302*b*, 302*c*, 302*n*) to facilitate performance of various operations related to managing the computing resource components, the provisioning components, and/or the connection components declared therein for the cloud-based computing platform 124. For example, to facilitate performance of such management operations, the orchestration engine component 102 can facilitate execution of one or more operations described herein with reference to the orchestration engine component 102 and/or associated components, as well as FIG. 1 and FIG. 2. For instance, the orchestration engine component 102 can facilitate: retrieving (e.g., via the retrieval component 202) connection components declared in the blueprints 302*a*, 302*b*, 302*c*, 302*n*; ranking such connection components (e.g., via the ranking component 118); selecting one or more such connection components based on rank (e.g., via the selection component 120); and/or employing the selected connection component(s) to establish a connection (e.g., operative, communicative, etc.) between the provisioning components and the computing resource components declared in the blueprints 302*a*, 302*b*, 302*c*, 302*n*. In other embodiments, the orchestration engine component 102 can further facilitate performance of any and/or all other operations (e.g., with respect to the blueprints 302*a*, 302*b*, 302*c*, 302*n*) as described herein with reference to the storage component 204, the update component 206, and/or the filter component 208, as well as FIG. 1 and FIG. 2.

Figure 4:
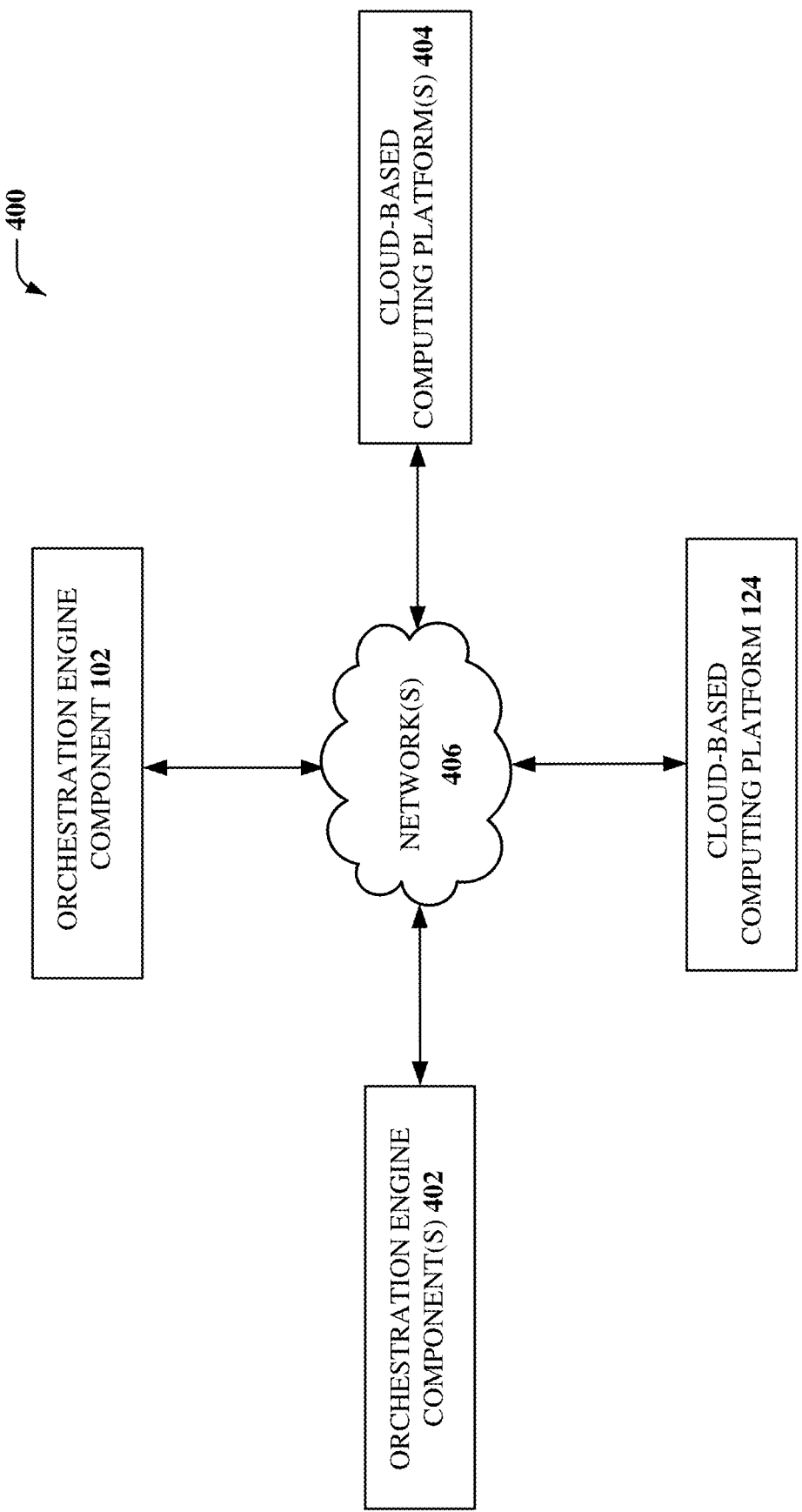
FIG. 4 illustrates a block diagram of an example, non-limiting system 400 that facilitates orchestration engine components for a cloud computing environment in accordance with one or more embodiments described herein.

FIG. 4 illustrates a block diagram of another example, non-limiting system 400 that facilitates orchestration engine components for a cloud computing environment in accordance with one or more embodiments described herein. Repetitive description of like elements employed in respective embodiments is omitted for sake of brevity.

In the embodiment shown in FIG. 4, the system 400 can comprise one or more orchestration engine components 402, one or more cloud-based computing platforms 404, and/or one or more networks 406. In several embodiments, the orchestration engine components 402 can be the same as, similar to, or different from the orchestration engine component 102 described above with reference to FIG. 1, FIG. 2, and FIG. 3. For example, the orchestration engine components 402 can comprise the same, similar, or different components, properties, formats, functionalities, etc., as the orchestration engine component 102 described above with reference to FIG. 1, FIG. 2, and FIG. 3. In some embodiments, the cloud-based computing platforms 404 can be the same as, similar to, or different from the cloud-based computing platform 124 described above with reference to FIG. 1, FIG. 2, and FIG. 3. For example, the cloud-based computing platforms 404 can comprise the same, similar, or different components, properties, formats, functionalities, etc., as the cloud-based computing platform 124 described above with reference to FIG. 1, FIG. 2, and FIG. 3.

In multiple embodiments, the orchestration engine component 102 can transmit/receive (e.g., via networks 406) one or more blueprints (e.g., blueprint 110 and/or blueprints 302*a*, 302*b*, 302*c*, 302*n*) to/from other orchestration engines (e.g., orchestration engine components 402) and/or other cloud computing environments (e.g., cloud-based computing platforms 404). In several embodiments, the orchestration engine component 102 can facilitate performance of one or more operations described herein with reference to the orchestration engine component 102 and/or associated components, as well as FIG. 1, FIG. 2, and FIG. 3. For example, the orchestration engine component 102 can facilitate: retrieving (e.g., via the retrieval component 202) connection components from the orchestration engine components 402 and/or from various resources associated with the cloud-based computing platforms 404; ranking such connection components (e.g., via the ranking component 118); selecting one or more such connection components based on rank (e.g., via the selection component 120); and/or employing the selected connection component(s) to establish a connection (e.g., operative, communicative, etc.) between provisioning components (e.g., provisioning components 114) and computing resource components (e.g., computing resource components 112). According to several other embodiments, the orchestration engine component 102 can further facilitate performance of any and/or all other operations (e.g., with respect to the orchestration engine components 402 and/or the cloud-based computing platforms 404) as described herein with reference to the storage component 204, the update component 206, and/or the filter component 208, as well as FIG. 1, FIG. 2, and FIG. 3.

In numerous embodiments, the networks 406 can include wired and/or wireless networks, including, but not limited to, a cellular network, a wide area network (WAN) (e.g., the Internet) or a local area network (LAN). For example, the networks 406 can comprise wired or wireless technology including, but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLU-ETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, the orchestration engine component 102 can thus include hardware (e.g., a central processing unit (CPU), a transceiver, a decoder), software (e.g., a set of threads, a set of processes, software in execution) or a combination of hardware and software that facilitates communicating information between the orchestration engine component 102 and external systems, sources, and devices.

FIG. 5 illustrates an example, non-limiting declarative-based representation 500 that facilitates orchestration engine components for a cloud computing environment in accordance with one or more embodiments described herein. Repetitive description of like elements employed in respective embodiments is omitted for sake of brevity.

In some embodiments, a blueprint 110 can comprise the declarative-based representation 500, which can be executed by the orchestration engine component 102 (e.g., via the processor 106) and/or various components associated with the orchestration engine component 102 as described herein with reference to FIG. 1 to FIG. 4. In an embodiment, at section 502, the orchestration engine component 102 can employ a first connection component 116 (e.g., "connection {id=0"}) to connect a first provisioning component 114 (e.g., "remote-exec") to a computing resource component 112 (e.g., "aws_instance"). Continuing with section 502, in response to the orchestration engine component 102 establishing such a connection, the first provisioning component 114 (e.g., "remote-exec") can remove the first connection component 116 (e.g., "connection {id=0"}) and enable and/or add a second connection component 116 (e.g., "connection {id=1"}). In an embodiment, at section 504, the retrieval component 202 can facilitate retrieving (e.g., via "returns [connection {id=1"}) the second connection component 116 (e.g., "connection {id=1"}) from the first provisioning component 114 (e.g., "remote-exec"). Continuing with section 504, the ranking component 118 can facilitate assigning a ranking value (e.g., via "score=5") to the second connection component 116 (e.g., "connection {id=1"}). Continuing with section 504, the first provisioning component 114 (e.g., "remote-exec") can disenable (e.g., via "enabled=false") the first connection component 116 (e.g., "connection {id=0"}). In an embodiment, at section 506, the filter component 208 can detect the second connection component 116 (e.g., "connection {id=1"}), which can be a dependency connection component, and upon such detection, the orchestration engine component 102 can employ the second connection component 116 (e.g., "connection {id=1"}) to connect a second provisioning component 114 (e.g., "ansible") to the computing resource component 112 (e.g., "aws_instance").

Figure 6:
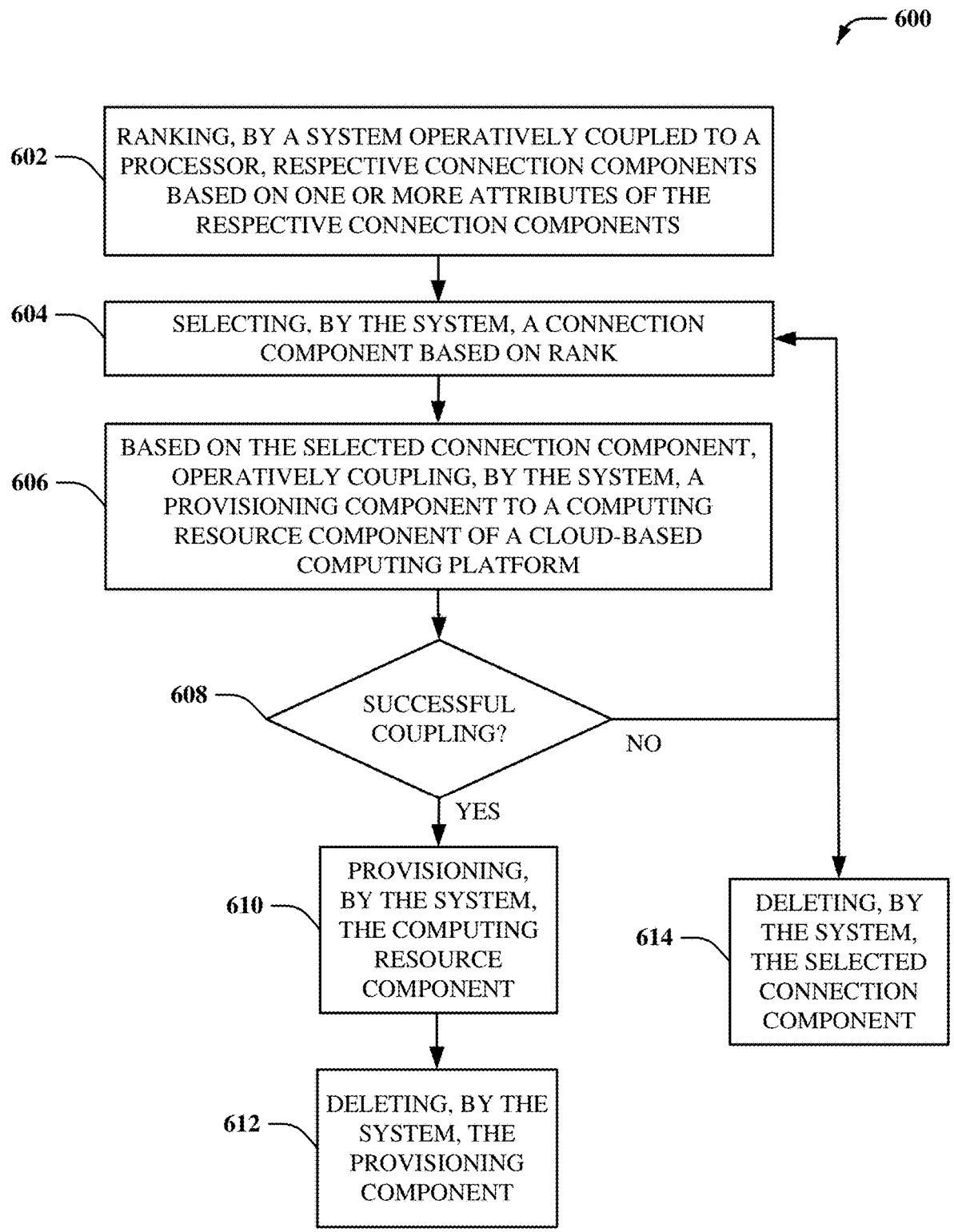
FIG. 6 illustrates a flow diagram of an example, non-limiting computer-implemented method 600 that facilitates orchestration engine components for a cloud computing environment in accordance with one or more embodiments described herein.

FIG. 6 illustrates a flow diagram of an example, non-limiting computer-implemented method 600 that facilitates orchestration engine components for a cloud computing environment in accordance with one or more embodiments described herein. Repetitive description of like elements employed in other embodiments described herein is omitted for sake of brevity.

At 602, a system (e.g., orchestration engine component 102) operatively coupled to a processor (e.g., processor 106) can rank (e.g., via the ranking component 118) respective connection components (e.g., connection components 116) based on one or more attributes of the respective connection components. At 604, the system can select a connection component based on rank (e.g., via the selection component 120). At 606, the system can operatively couple a provisioning component (e.g., provisioning component 114) to a computing resource component (e.g., computing resource component 112) of a cloud-based computing platform (e.g., cloud-based computing platform 124), based on the selected connection component. At 608, it is determined whether the system successfully coupled the provisioning component to the computing resource component based on the selected connection component.

If it is determined at 608 that the system did not successfully couple the provisioning component to the computing resource component based on the selected connection component, the computer-implemented method 600 can proceed back to 604 and/or to 614. If the computer-implemented method 600 proceeds back to 604, the system can, at 604, select (e.g., via the selection component 120) another connection component based on rank (e.g., a connection component that is different from the connection component previously selected). If the computer-implemented method 600 proceeds to 614, the system can, at 614, delete the selected connection component (e.g., via the update component 206).

If it is determined at 608 that the system did successfully couple the provisioning component to the computing resource component based on the selected connection component, the computer-implemented method 600 can proceed to 610 and 612. At 610, the system can provision the computing resource component (e.g., via the provisioning component 114). At 612, the system can delete the provisioning component (e.g., via the update component 206).

Figure 7:
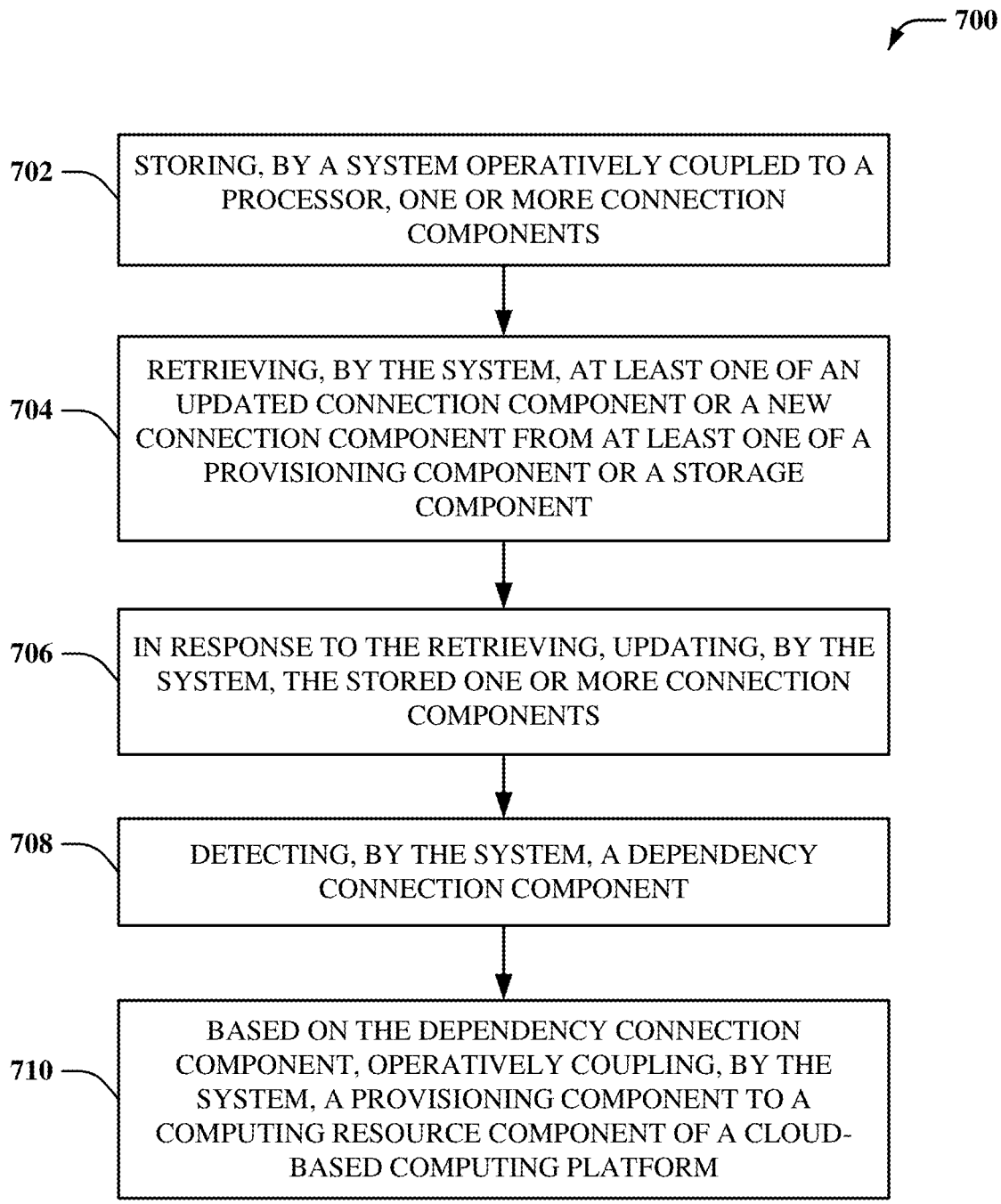
FIG. 7 illustrates a flow diagram of an example, non-limiting computer-implemented method 700 that facilitates orchestration engine components for a cloud computing environment in accordance with one or more embodiments described herein.

FIG. 7 illustrates a flow diagram of an example, non-limiting computer-implemented method 700 that facilitates orchestration engine components for a cloud computing environment in accordance with one or more embodiments described herein. Repetitive description of like elements employed in other embodiments described herein is omitted for sake of brevity.

At 702, a system (e.g., orchestration engine component 102) operatively coupled to a processor (e.g., processor 106) can store (e.g., via the storage component 204) one or more connection components (e.g., connection components 116). At 704, the system can retrieve (e.g., via the retrieval component 202) at least one of an updated connection component or a new connection component from at least one or a provisioning component (e.g., provisioning component 114) or a storage component (e.g., a storage component coupled to orchestration engine components 402). At 706, in response to retrieving an updated or new connection component, the system can update (e.g., via the update component 206) the stored connection components. At 708, the system can detect a dependency connection component (e.g., via the filter component 208). At 710, the system can operatively couple a provisioning component (e.g., provisioning component 114) to a computing resource component (e.g., computing resource component 112) of a cloud-based computing platform (e.g., cloud-based computing platform 124), based on the dependency connection component.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
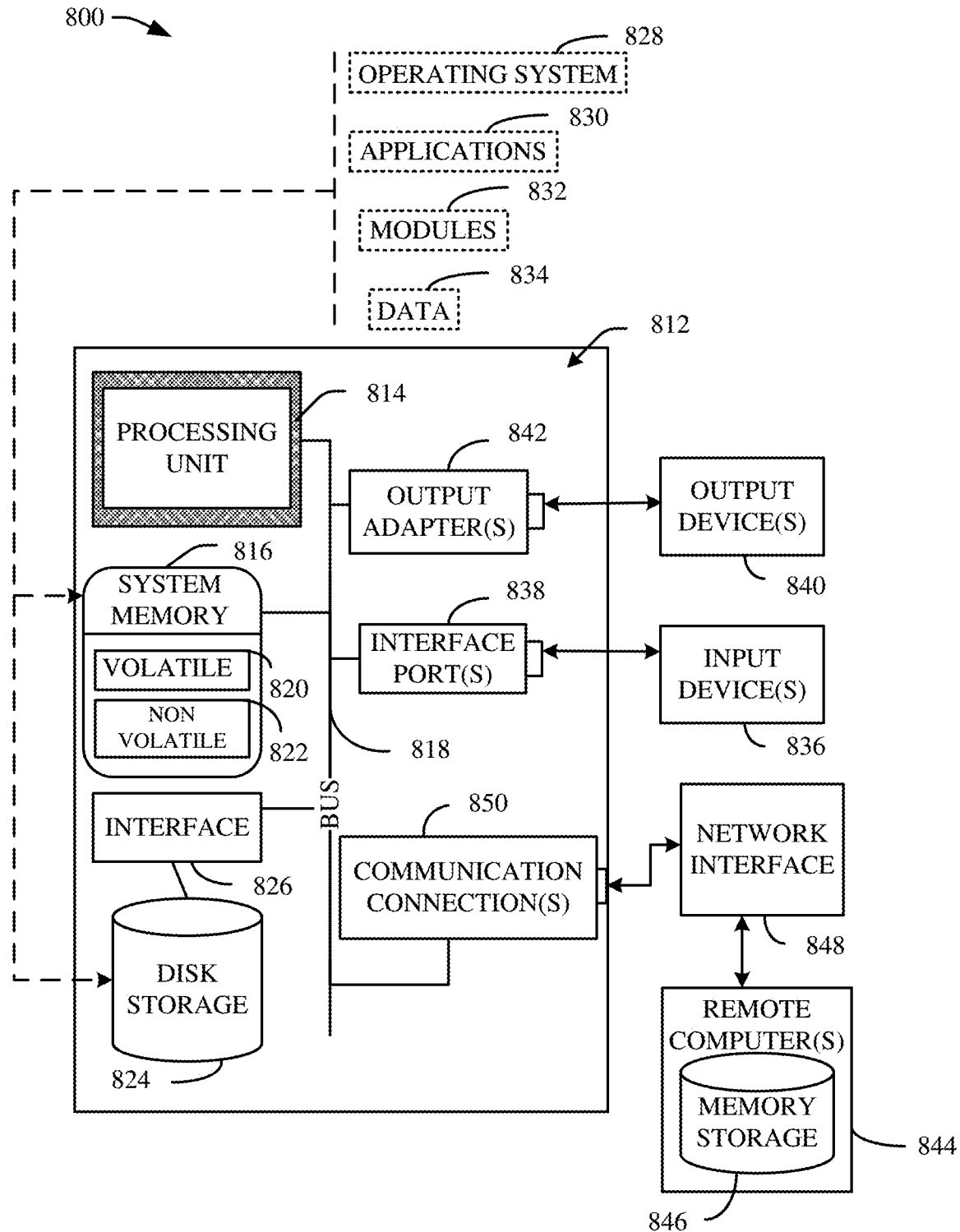
FIG. 8 illustrates a block diagram of an example, non-limiting operating environment 800 in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
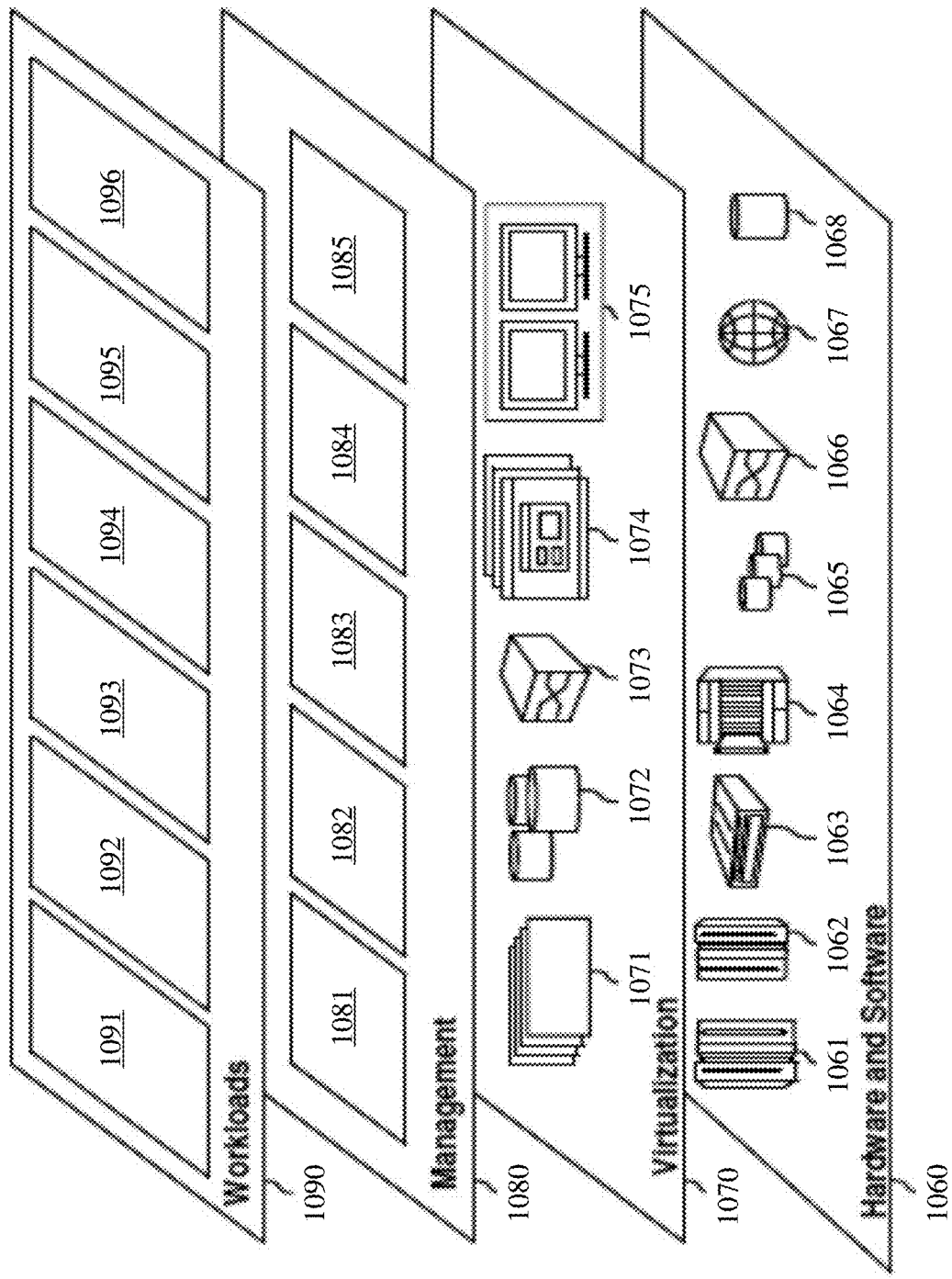
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and orchestration engine process software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor that executes the computer executable components stored in the memory, wherein the computer executable components comprise:
        a ranking component that ranks respective connection components based on one or more attributes of the respective connection components, wherein the respective connection components are executable to establish operative couplings between provisioning components and computing resource components, and the one or more attributes comprise one or more access permission levels defining breadth of access with respect to respective operative couplings between the provisioning components and the computing resource components, and wherein the computing resource components are computing resources of the system employed for execution of workloads, and the provisioning components are executable to configure the computing resource components for the execution of the workloads;
        a selection component that selects a connection component based on rank; and
        an orchestration engine component that executes the selected connection component to operatively couple a provisioning component to a computing resource component of a cloud-based computing platform, and
        in response to the selected connection component failing to operatively couple the provisioning component to the computing resource component:
            the selection component selects a second connection component based on rank, and
            the orchestration engine component executes the second connection component to operatively couple the provisioning component to the computing resource component.

2. The system of claim 1, wherein in response to the second connection component failing to operatively couple the provisioning component to the computing resource component, iteratively repeating until the provisioning component is operatively coupled to the computing resource component:
    the selection component selects another connection component based on rank, and
    the orchestration engine component executes the other connection component to operatively couple the provisioning component to the computing resource component.

3. The system of claim 1, further comprising a retrieval component that retrieves the respective connection components from at least one of the provisioning component or a storage component.

4. The system of claim 3, wherein the retrieval component retrieves at least one of a restrictive configuration connection component or a permissive configuration connection component.

5. The system of claim 1, further comprising:
    a storage component that stores the respective connection components; and
    an update component that updates the respective connection components stored in the storage component based on a retrieval component retrieving at least one of an updated connection component or a new connection component from the provisioning component, thereby facilitating at least one of improved processing efficiency associated with the processor or improved storage capacity associated with the storage component.

6. The system of claim 1, further comprising a filter component that detects a dependency connection component and, based on the dependency connection component, the orchestration engine component operatively couples the provisioning component to the computing resource component, thereby facilitating improved processing efficiency associated with the processor.

7. The system of claim 1, wherein the one or more access permission levels comprise at least one of an exclusive access permission level that facilitates operatively coupling an exclusive provisioning component to the computing resource component or a non-exclusive access permission level that facilitates operatively coupling one or more non-exclusive provisioning components to the computing resource component.

8. The system of claim 1, wherein the ranking component ranks the respective connection components based on one or more ranking policies defined by an entity.

9. The system of claim 1, wherein at least one of the ranking component or the selection component are indicative of a declarative-based machine-readable component.

10. A computer-implemented method, comprising:
    ranking, by a system operatively coupled to a processor, respective connection components based on one or more attributes of the respective connection components, wherein the respective connection components are executable to establish operative couplings between provisioning components and computing resource components, and the one or more attributes comprise one or more access permission levels defining breadth of access with respect to respective operative couplings between the provisioning components and the computing resource components, and wherein the computing resource components are computing resources of the system employed for execution of workloads, and the provisioning components are executable to configure the computing resource components for the execution of the workloads;
    selecting, by the system, a connection component based on rank;
    executing, by the system, the selected connection component to operatively couple a provisioning component to a computing resource component of a cloud-based computing platform; and
    in response to the selected connection component failing to operatively couple the provisioning component to the computing resource component:
        selecting, by the system, a second connection component based on rank, and
        executing, by the system, the second connection component to operatively couple the provisioning component to the computing resource component.

11. The computer-implemented method of claim 10, further comprising:
    in response to the second connection component failing to operatively couple the provisioning component to the computing resource component, iteratively repeating until the provisioning component is operatively coupled to the computing resource component:
        selecting, by the system, another connection component based on rank; and executing, by the system, the other connection component to operatively couple the provisioning component to the computing resource component.

12. The computer-implemented method of claim 10, further comprising retrieving, by the system, the respective connection components from at least one of the provisioning component or a storage component.

13. The computer-implemented method of claim 12, wherein the retrieving comprises retrieving at least one of a restrictive configuration connection component or a permissive configuration connection component.

14. The computer-implemented method of claim 10, further comprising:
retrieving, by the system, at least one of an updated connection component or a new connection component from the provisioning component; and
in response to the retrieving, updating, by the system, the respective connection components, thereby facilitating improved processing efficiency associated with the processor.

15. The computer-implemented method of claim 10, further comprising:
detecting, by the system, a dependency connection component; and
based on the dependency connection component, operatively coupling, by the system, the provisioning component to the computing resource component, thereby facilitating improved processing efficiency associated with the processor.

16. A computer program product facilitating an orchestration engine process, the computer program product comprising a computer readable storage medium having program instructions embodied therewith, the program instructions executable by a processor to cause the processor to:
rank, by the processor, respective connection components based on one or more attributes of the respective connection components, wherein the respective connection components are executable to establish operative couplings between provisioning components and computing resource components, and the one or more attributes comprise one or more access permission levels defining breadth of access with respect to respective operative couplings between the provisioning components and the computing resource components, and wherein the computing resource components are computing resources of the system employed for execution of workloads, and the provisioning components are executable to configure the computing resource components for the execution of the workloads;
select, by the processor, a connection component based on rank;
executing, by the processor, the selected connection component to operatively couple a provisioning component to a computing resource component of a cloud-based computing platform; and
in response to the selected connection component failing to operatively couple the provisioning component to the computing resource component:
select, by the processor, a second connection component based on rank, and
execute, by the processor, the second connection component to operatively couple the provisioning component to the computing resource component.

17. The computer program product of claim 16, wherein the program instructions are further executable by the processor to cause the processor to:
in response to the second connection component failing to operatively couple the provisioning component to the computing resource component, iteratively repeating until the provisioning component is operatively coupled to the computing resource component:
select, by the processor, another connection component based on rank; and
executing, by the processor, the other connection component to operatively couple-the provisioning component to the computing resource component.

18. The computer program product of claim 16, wherein the program instructions are further executable by the processor to cause the processor to retrieve, by the processor, the respective connection components from at least one of the provisioning component or a storage component.

19. The computer program product of claim 16, wherein the program instructions are further executable by the processor to cause the processor to:
retrieve, by the processor, at least one of an updated connection component or a new connection component from the provisioning component; and
in response to the retrieving, update, by the processor, the respective connection components, thereby facilitating improved processing efficiency associated with the processor.

20. The computer program product of claim 16, wherein the program instructions are further executable by the processor to cause the processor to:
detect, by the processor, a dependency connection component; and
based on the dependency connection component, operatively couple, by the processor, the provisioning component to the computing resource component, thereby facilitating improved processing efficiency associated with the processor.

* * * * *